United States Patent
Lin et al.

(10) Patent No.: US 8,048,344 B2
(45) Date of Patent: Nov. 1, 2011

(54) METHOD FOR SMOOTHING A SURFACE OF AN OPTICAL ELEMENT WITH LASER

(75) Inventors: Ching-Fuh Lin, Taipei (TW); Shih-Che Hung, Taipei (TW); Shu-Chia Shiu, Taipei (TW)

(73) Assignee: National Taiwan University, Taipei (TW)

( * ) Notice: Subject to any disclaimer, the term of this patent is extended or adjusted under 35 U.S.C. 154(b) by 247 days.

(21) Appl. No.: 12/289,408

(22) Filed: Oct. 28, 2008

(65) Prior Publication Data

US 2010/0025871 A1 Feb. 4, 2010

(30) Foreign Application Priority Data

Jul. 30, 2008 (TW) ................................ 97128906 A

(51) Int. Cl.
*B29D 11/00* (2006.01)
(52) U.S. Cl. ...................... 264/1.37; 264/1.24; 264/1.27; 264/482
(58) Field of Classification Search ............... 264/1.1, 264/1.24, 1.27, 1.37, 400, 482; 425/174.4
See application file for complete search history.

(56) References Cited

U.S. PATENT DOCUMENTS
7,232,982 B2    6/2007    Takami

FOREIGN PATENT DOCUMENTS
JP     62-85433     *     4/1987

OTHER PUBLICATIONS

Cai, M.; Painter, O., and Vahala, K.J., "Fiber-coupled Microsphere Laser", Opt. Lett., 2000, 25, pp. 1430-1432.
Bilici, T., IS-CI, S., Kurt, A., and Serpeng.Uzel, A.; "Microsphere-based Channel Dropping Filter with an Integrated Photodetector", IEEE Photonics Technol. Lett., 2004, 16, pp. 476-478.
Tapalian, H.C., Laine, J.P., and Lane, P.A., "Thermo Optical Switches Using Coated Microsphere Resonators", IEEE Photonics Technol. Lett., 2002, 14, pp. 1118-1120.
Teraoka, I., Arnold, S., and Vollmer, F.; "Perturbation Approach to Resonance Shifts of Whispering-Gallery Modes in a Dielectric Microsphere as a Probe of a Surrounding Medium", J. Opt. Soc. Am.B, Opt. Phys., 2003, 20, pp. 1937-1946.
K.K. Lee, D.R. Lim, H.-C. Luan, A. Agarwal, J. Foresi, and L.C. Kimerling, "Effect of Size and Roughness on Light Transmission in a Si/SiO2 Waveguide: Experiments and Model", Appl. Phys. Lett., 77, 1617 (2000).
A. Sakai, G. Hara, and T. Baba, "Propagation Characteristics of Ultrahigh Optical Waveguide on Silicon-on-Insulator Substrate", Jpn.J. Appl. Phys. Part 2, 4B, L383, (2001).

(Continued)

*Primary Examiner* — Mathieu D. Vargot
(74) *Attorney, Agent, or Firm* — Rosenberg, Klein & Lee

(57) ABSTRACT

The present invention discloses a method for smoothing a surface of an optical element with a laser. Firstly, an optical element having a rough surface is provided. Next, the rough surface of the optical element is illuminated with a laser. The rough surface absorbs laser energy and melts into a liquid. The liquid is stretched and planarized by the surface tension of the rough surface and then solidifies into a smooth surface. The present invention can smooth the surface of an optical element and promote the resonant or waveguide performance of the optical element.

17 Claims, 7 Drawing Sheets

OTHER PUBLICATIONS

P. Dumon, W. Bogaerts, J. Van Campenhout, V. Wiaux, J. Wouters, S. Beckx, and R. Baets, "Low Loss Photonic Wires and Compact Ring Resonators in Silicon-on-Insulator", LEOS Benelux Annual Symposium 2003, Netherlands (2003).

H. Kuribayashi, R. Hiruta, and R. Shimizu, K. Sudoh and H. Iwasaki, "Shape Transformation of Silicon Trenches During Hydrogen Annealing", J. Vac. Sci. Technol. A21, 1279 (2007).

J.S. Xia, Y. Ikegami, K. Nemoto, and Y. Shiraki, "Observation of Whispering-Gallery Modes in Si Microdisk at Room Temperature", Appl. Phys. Lett. 90, 14102 (2007).

Satoshi Iwamoto and Yashuhiko Arakawa, "Observation of Enhanced from Silicon Photonic Crystal Nanocavity at Room Temperature", Appl. Phys. Lett. 91, 211104 (2007).

J. Takahashi, T. Tsuchizawa, T. Watanabe, and S. Itabashi, "Oxidation-Induced Improvement in the Sidewall Morphology and Cross-Sectional Profile of Silicon Wire Waveguides", J. Vac. Sci. Technol. B. 22, 2533 (2004).

D.K. Sparacin, S.J. Spector, and L.C. Kimerling, "Silicon Waveguide Sidewall Smoothing by Wet Chemical Oxidation", J. Lightwave Technol. 23, 2455 (2005).

T. Tsuchizawa, T. Watanabe, E. Tamechika, T.Shoji, K. Yamada, J. Takahashi, S. Uchiyama, S. Itabashi, and H. Morita, "Fabrication and Evaluation of Submicron-Square Si Wire Waveguides with Spot-Size Converters", Paper TuU2 presented at LEOS Annual Meeting, p. 287, Glasgow, UK (2002).

* cited by examiner

METHOD FOR SMOOTHING A SURFACE OF AN OPTICAL ELEMENT WITH LASER

BACKGROUND OF THE INVENTION

1. Field of the Invention

The present invention relates to a fabrication method, particularly to a method for smoothing a surface of an optical element with a laser.

2. Description of the Related Art

In optoelectronics, the optical resonator is a very important element, which enhances the intensity of light having a specified wavelength and has been widely used in various optoelectronic devices, such as micro-laser devices, optical filters, optical switches, ultra-fine sensors, high-resolution spectrometers and so on.

Based on the advanced semiconductor technologies, many researches are devoted to tiny and low-cost integrated optical elements. However, the surface roughness of a tiny optical resonator results in too high a scattering loss and impairs the realization of a tiny and high-density optical integrated circuit.

J. S. Xia et al. fabricated a disc-type optical microcavity and observed therefrom a silicon emission spectrum intensified by 30 times at a room temperature and a whispering gallery mode. The optical resonator has a Q value (quality factor) of 500-700, and they believe that the Q value can be greatly increased by smoothing the roughness of the lateral surface. Satoshi Iwamoto et al. fabricated a photonic-crystal submicron optical resonator and observed a photoluminescence enhanced by 310 times therefrom. This opticalresonator has a Q value of about 5000. However, the observed Q value is much smaller than the theoretical Q value 21000, and they suppose that the fact results from the lateral surface roughness generated in fabrication.

Many methods have been used to improve surface roughness and decrease scattering loss, including the hydrogen annealing method, the dry oxidation method, and the wet chemical etching method. In the hydrogen annealing method, a sample is placed in a hydrogen-filled furnace at a temperature of 1100° C. for 3 minutes, whereby the RMS (Root-Mean-Square) roughness is reduced to 0.11 nm. In the dry oxidation method, a sample is placed in a furnace at a temperature of 1100° C. for 50 minutes to form an autogenous oxide layer, whereby the RMS roughness is reduced to 0.5 nm. In the wet chemical etching method, the surface of a sample is oxidized with a chemical solution, whereby the RMS roughness is reduced to 0.7 nm.

The abovementioned methods respectively have their advantages and disadvantages. In the hydrogen annealing method and the dry oxidation method, the sample has to suffer a high temperature. In general, such a high temperature will seriously damage the crystalline quality of the electronic circuit. The dry oxidation method and the wet chemical etching method can only improve surface roughness to a limited extent. The wet chemical etching method not only consumes the material but also varies the topography of the material.

Accordingly, the present invention proposes a method for smoothing a surface of an optical element with a laser to solve the abovementioned problems and improve the resonator and waveguide performance of an optical element.

SUMMARY OF THE INVENTION

The primary objective of the present invention is to provide a method for smoothing a surface of an optical element with a laser to improve the resonator or waveguide performance of an optical element.

Another objective of the present invention is to provide a method for smoothing a surface of an optical element with a laser, which improves the wavelength selection capability of an optical element, and which applies to the fabrication of an integrated device to achieve a high-performance electronic circuit or optical circuit.

To achieve the abovementioned objectives, the present invention proposes a method for smoothing a surface of an optical element with a laser, which comprises steps: providing an optical element having a rough surface; and illuminating the rough surface of the optical element with a laser. The rough surface absorbs laser energy and melts into a liquid. The liquid is stretched and planarized by the surface tension of the rough surface and then solidifies into a smooth surface.

Below, the embodiments are described in detail in cooperation with the drawings to make easily understood the characteristics, technical contents and accomplishments of the present invention.

DETAILED DESCRIPTION OF THE INVENTION

Figure 1A:
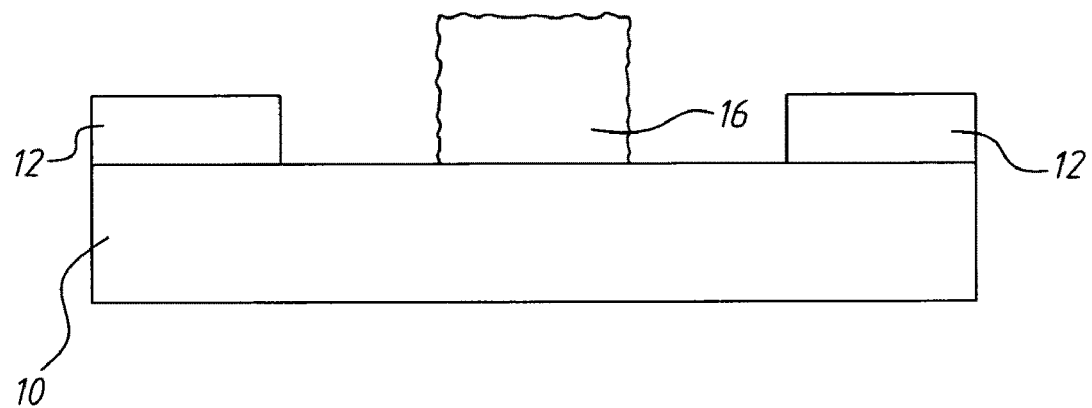
FIGS. 1(a)-1(e) are diagrams schematically showing steps of a method for smoothing a surface of an optical element with a laser according to the present invention.
Figure 1B:
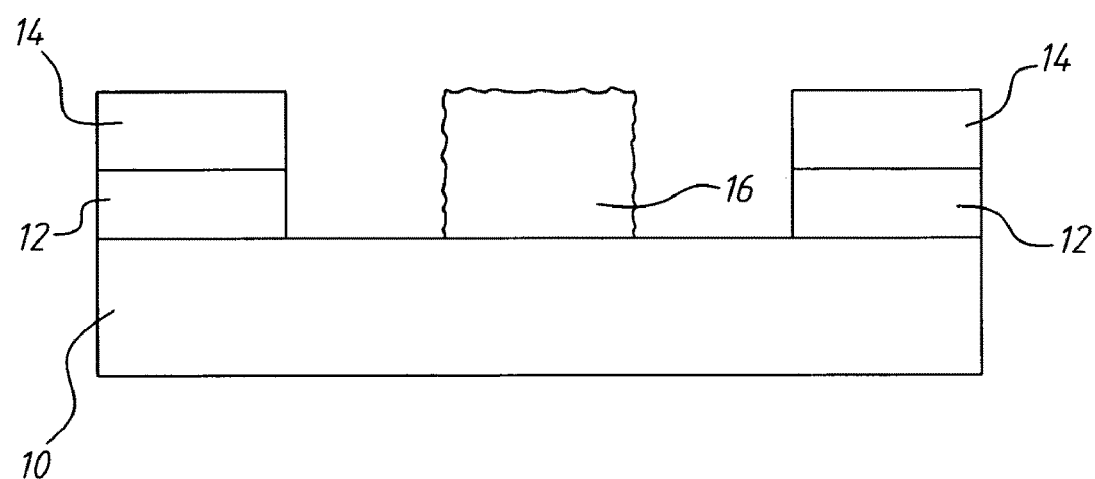
Figure 1C:
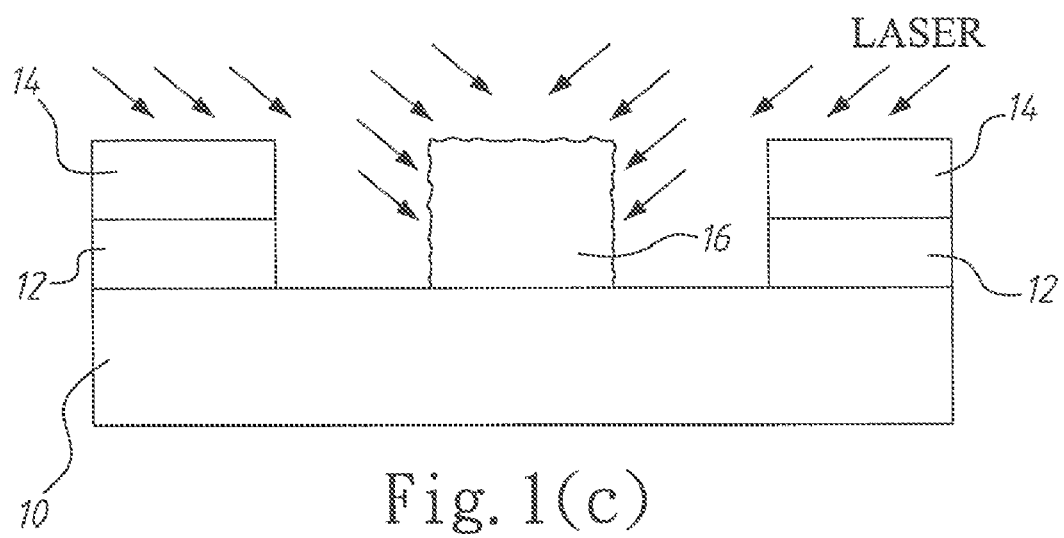
Figure 1D:
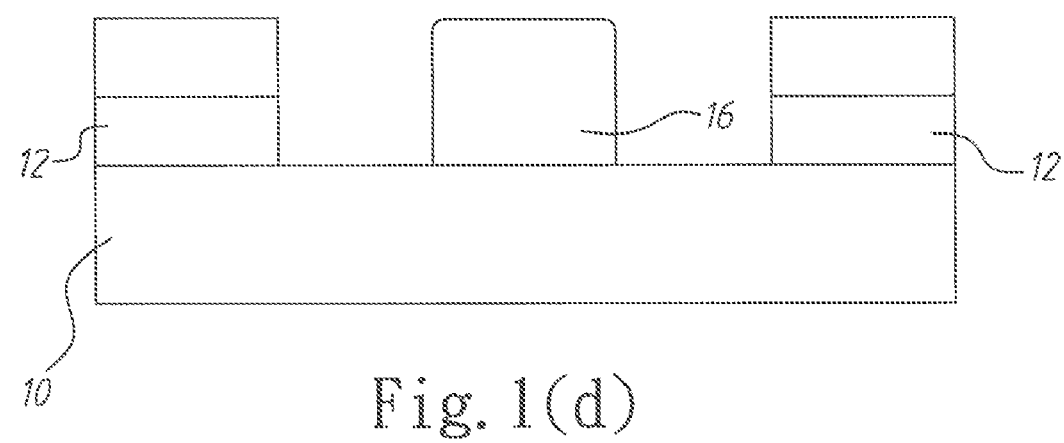
Figure 1E:
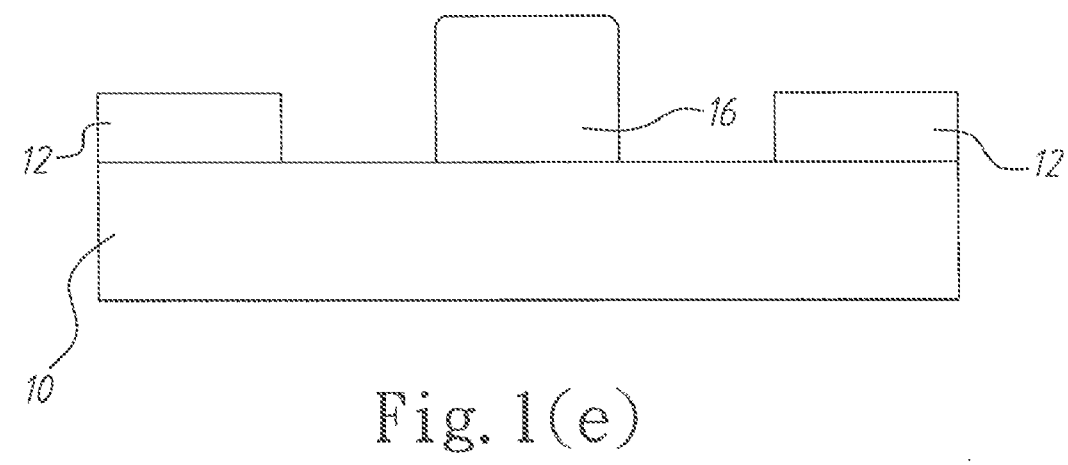

Refer to from FIG. 1(a) to FIG. 1(e) diagrams schematically showing steps of the method for smoothing a surface of an optical element with a laser according to the present invention. As shown in FIG. 1(a), a substrate 10 having at least one optical element 16 and at least one electronic element 12 is provided firstly. The optical element 16 is a waveguide or a resonator and made of silicon, silicon dioxide, a semiconductor, an organic compound, a glass, or a dielectric material. The resonator is a Fabry-Perot resonator or a photonic-crystal resonator and has a shape of a disc, a sphere, an ellipsoid, a parallelepiped, a cuboid, or a triangular prism. The waveguide has a shape of a cylinder. The substrate 10 is a transparent substrate, a semiconductor substrate, a metal substrate, or a ceramic substrate. Next, as shown in FIG. 1(b), a light-blocking layer 14 is formed on the electronic elements 12, which are to be protected in the succeeding steps. The light-blocking layer 14 is a light-absorbing layer or a light-reflecting layer. The light-blocking layer is made of a metallic material, a photoresist material, or a dielectric material. Next, as shown in FIG. 1(c), the optical element 16 is arranged in the designed optical path and illuminated with a laser. The environment of laser illumination is in a vacuum or full of a gas, such as air, hydrogen, nitrogen, or argon. The environment of laser illumination is at a temperature of from 100 to 1000° K. When illuminated by a laser, the rough surface of the optical element 16 absorbs laser energy and melts into a liquid. The liquid is stretched and planarized by the surface tension of the rough surface and then solidifies. As shown in FIG. 1(d), the rough surface of the optical element 16 becomes an atomic-scale smooth surface. Next, as shown in FIG. 1(e), the light-blocking layer 14 is removed. Thus, an optical element 16 with a smooth surface is obtained on the substrate 10.

The laser is projected onto all the optical elements 16 simultaneously or projected to the groups of the optical elements 16 one by one in sequence. When projected onto all the optical elements 16, the laser may hit some electronic elements 16 without damaging them because they are covered by the light-blocking layer 14. When the laser is projected to the groups of the optical elements 16 one by one in sequence, the laser intensity can be more accurately controlled. For a laser beam, the intensity attenuates from the center to the perimeter. Therefore, the laser beam may pass through an optical system to homogenize the intensity thereof before reaching the optical elements 16 so that the rough surface of the optical elements 16 can absorb a uniform-intensity laser.

The optical elements 16 should be illuminated with a laser having an appropriate energy so that the laser melt only the surface of the optical elements 16 with the body thereof maintained solid. The laser should have a wavelength that can be absorbed by the material of the optical elements 16. In the present invention, the laser may be an excimer laser, a solid-state laser, a gas laser, or a semiconductor laser. In the present invention, the laser is a CW (Continuous Wave) mode laser or a pulse mode laser. Laser beams having different incident angles have different transmission coefficients. In the present invention, the incident angle of the laser beam is adjusted to between 0 to 90 degrees (from vertical to parallel to the surface of the optical elements 16) to modulate the energy absorbed by the material.

Figure 2:
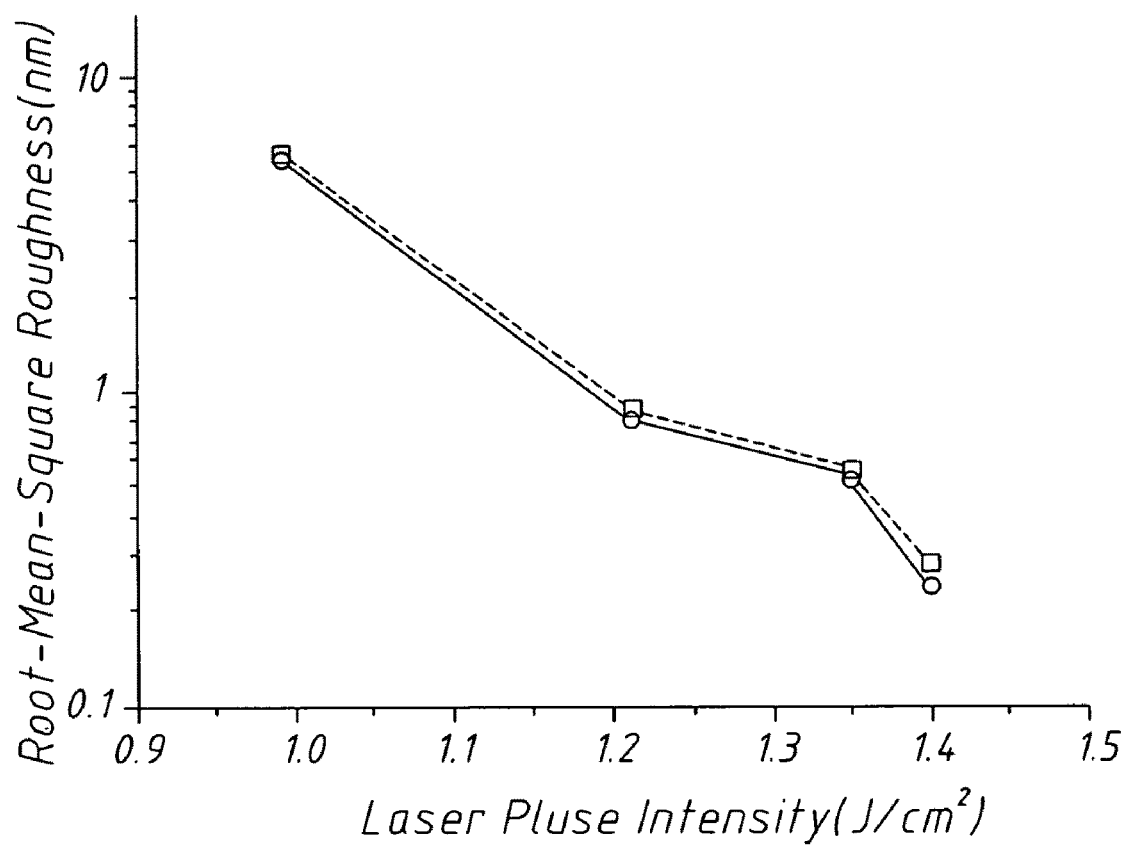
FIG. 2 is a diagram showing the relationship of the pulse-laser energy density and the silicon RMS roughness according to the present invention.

Refer to FIG. 2 a diagram showing the relationship of the pulse-laser energy density and the silicon RMS roughness. The burst length of the pulse laser is $25 \times 10^{-9}$ seconds, and the original RMS roughness of silicon is 13.95 nm. The square dots represent the silicon RMS roughnesses after one shot of pulse laser; the silicon RMS roughnesses are respectively 5.75 nm, 0.875 nm, 0.562 nm, and 0.28 nm when the pulse lasers have the energy densities of 0.99 J/cm$^2$, 1.21 J/cm$^2$, 1.35 J/cm$^2$, and 1.4 J/cm$^2$. The circle dots represent the silicon RMS roughnesses after five shots of pulse lasers; the silicon RMS roughnesses are respectively 5.5 nm, 0.81 nm, 0.529 nm, and 0.239 nm when the pulse lasers have the energy densities of 0.99 J/cm$^2$, 1.21 J/cm$^2$, 1.35 J/cm$^2$, and 1.4 J/cm$^2$.

Figure 3:
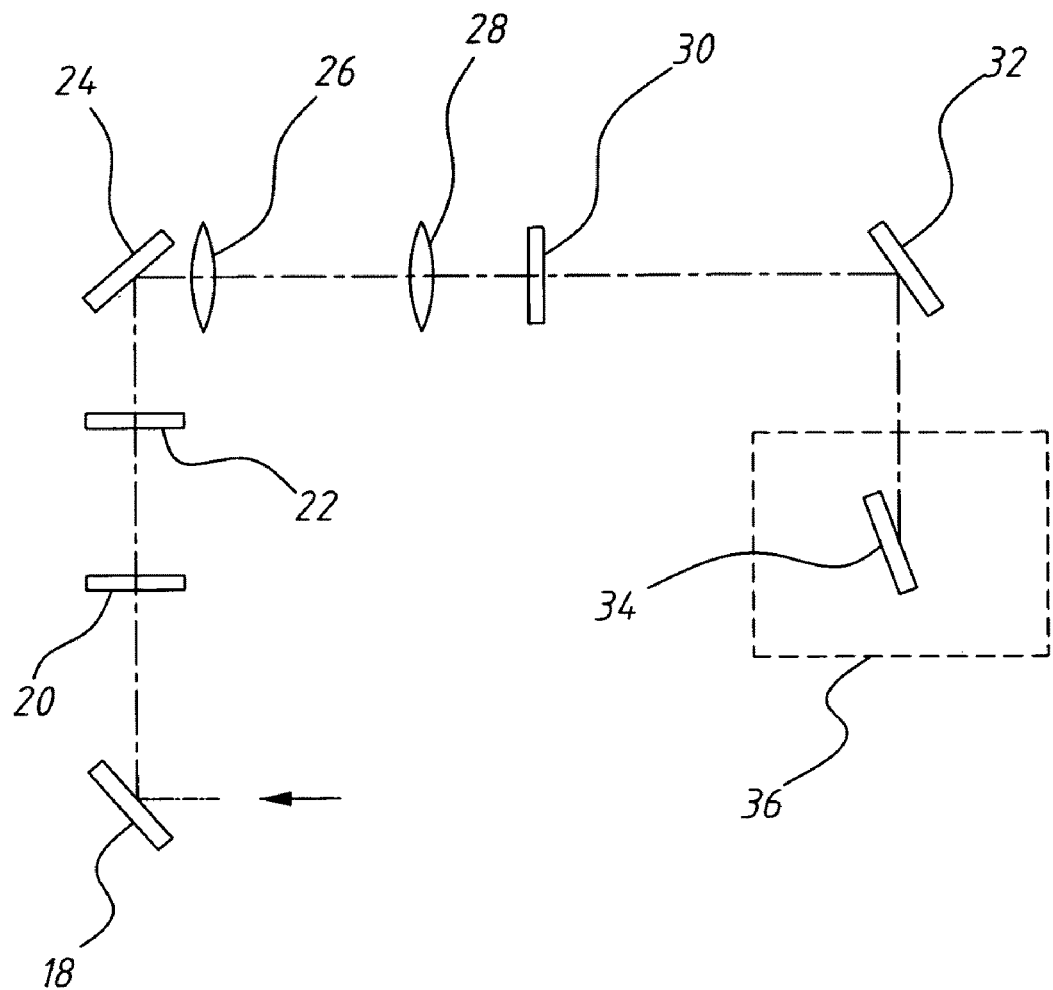
FIG. 3 is a diagram schematically showing a homogenization optical system according to the present invention.

Below, the process of fabricating a silicon resonator with a smooth surface is used to exemplify the method of the present invention. Refer to FIG. 3 a diagram schematically showing a homogenization optical system according to the present invention. The laser is projected to a homogenization lens assembly 20 by a reflection device 18. The laser is split into 18 components by the homogenization lens assembly 20. Next, the split components are projected to a homogenization lens assembly 22, and the homogenization lens assembly 22 rearranges the components to appropriate positions. Next, the components of the laser are reflected by a reflection device 24 to pass through a condensing lens 26 and a field lens 28. Next, the split components are projected to an identical position on a mask 30 that can block out the inhomogeneous light in the perimeter. Then, the laser light is projected to a sample 34 inside a vacuum chamber 36 by a reflection device 32. When projected to the sample 34, the laser light has dimensions of 4 cm×4 cm and a maximum intensity variation of 5%.

In this exemplification, the laser source adopts a KrF excimer laser, which is a pulse laser having a wavelength of 248 nm, a burst length of $25 \times 10^{-9}$ seconds, and a maximum energy density of as high as 2 J/cm$^2$. The sample 34 is placed in a vacuum environment lest the sample be polluted.

Figure 4A:
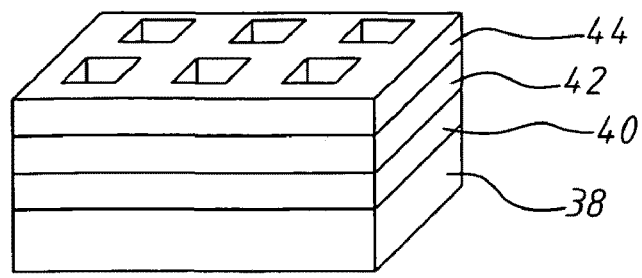
FIGS. 4(a)-4(e) are diagrams schematically showing steps of a method for fabricating a resonator with a smooth surface according to the present invention.
Figure 4B:
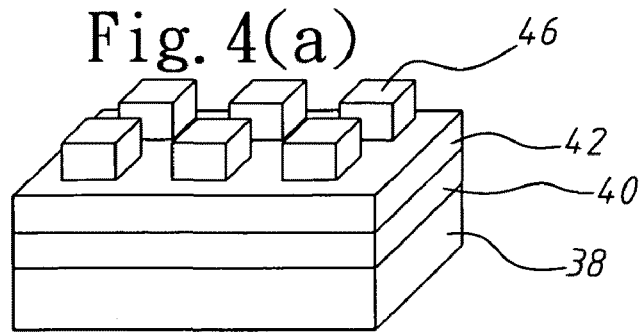
Figure 4C:
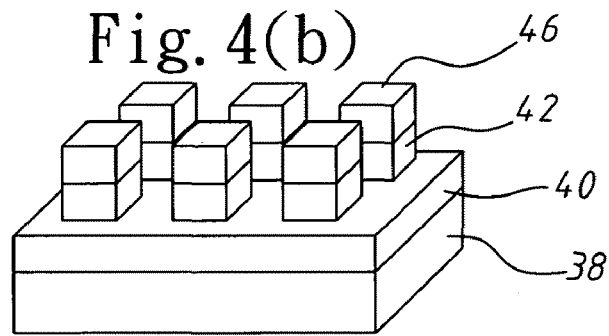
Figure 4D:
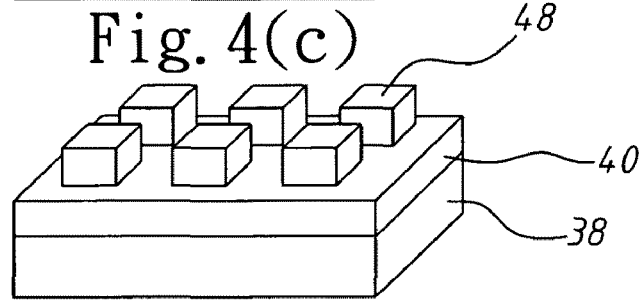
Figure 4E:
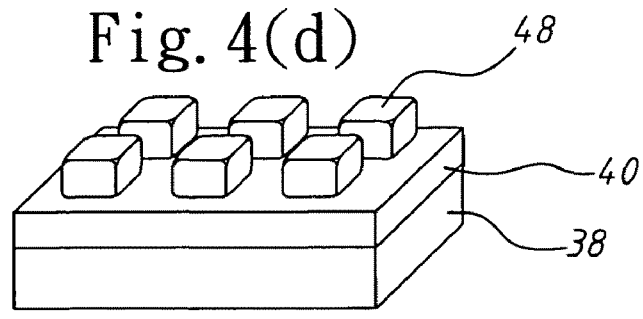

Refer to from FIG. 4(a) to FIG. 4(e) diagrams schematically showing steps of a method for fabricating a resonator with a smooth surface according to the present invention. As shown in FIG. 4(a), an SOI (Silicon On Insulator) substrate is provided, and the SOI substrate contains a silicon substrate 38, a silicon dioxide layer 40 and a silicon layer 42. A patterned photoresist layer 44 is formed on the silicon layer 42 to define the desired regions. Next, as shown in FIG. 4(b), a chromium mask 46 is formed on the defined regions of the silicon layer 42, and then the photoresist layer 44 is removed. Next, as shown in FIG. 4(c), a reactive ion etching (RIE) is performed on the silicon layer 42 to obtain the desired pattern. Next, as shown in FIG. 4(d), the chromium mask 46 is removed to obtain silicon resonators 48. Then, as shown in FIG. 4(e), the silicon resonators 48 are illuminated with a laser having an energy density of 1.4 J/cm$^2$ to obtain smooth surfaces.

Figure 5A:
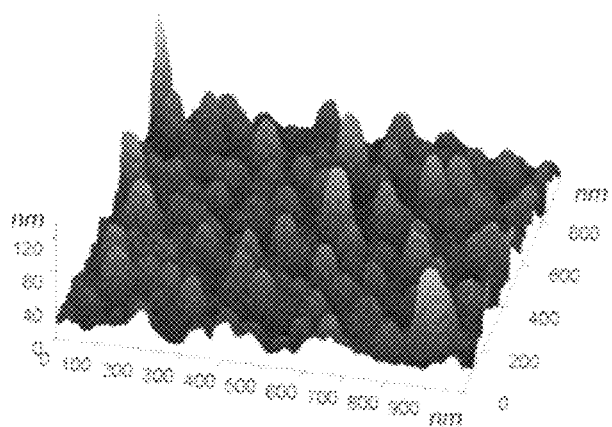
FIG. 5(a) is a diagram showing the relationship of the position and the surface roughness of a non-laser-illuminated silicon resonator according to the present invention.
Figure 5B:
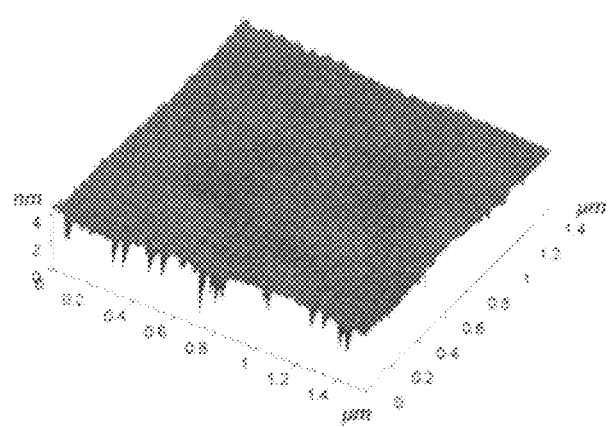
FIG. 5(b) is a diagram showing the relationship of the position and the surface roughness of a laser-illuminated silicon resonator according to the present invention.

An atomic force microscope is used to observe the topographies of the surfaces of the non-laser-illuminated silicon resonators and laser-illuminated silicon resonators. FIG. 5(a) shows the topography of a non-laser-illuminated silicon resonator having a RMS roughness of 14 nm. FIG. 5(b) shows the topography of a laser-illuminated silicon resonator having a RMS roughness of 0.28 nm—an atomic-scale smoothness.

Figure 6:
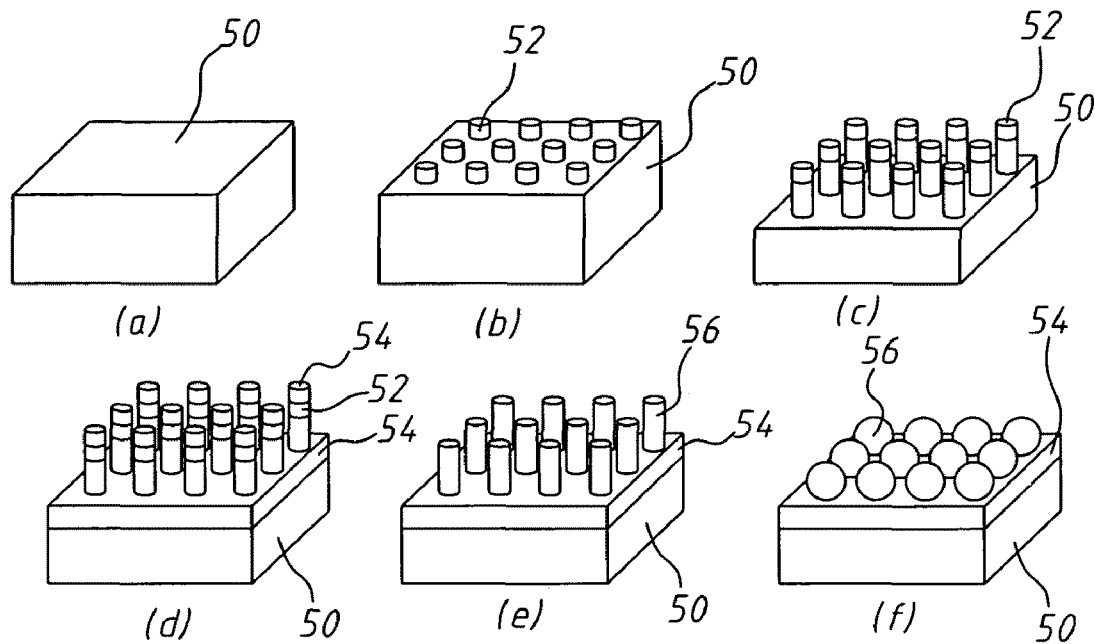
FIGS. 6(a)-6(f) are diagrams schematically showing steps of another method for fabricating a resonator with a smooth surface according to the present invention.

In general, the fabrication of silicon resonators needs to use SOI substrates, which can provide sufficient refractivity difference to realize the function of resonators. However, SOI substrates are very expensive and not used in common semiconductor processes. Therefore, the present invention also proposes a method for fabricating a silicon resonator with a silicon substrate. As shown in FIG. 6(a), a silicon substrate 50 is provided. Next, as shown in FIG. 6(b), at least one patterned mask 52 is formed on the silicon substrate 50 to define the regions where resonators are to be formed. Next, as shown in FIG. 6(c), the silicon substrate 50 together with the mask 52 is etched with a RIE (Reactive Ion Etching) method or an ICP-RIE (Inductively Coupled Plasma-RIE) method to obtain desired patterns, such as patterns having smaller diameters or line widths. Next, as shown in FIG. 6(d), a dielectric layer 54 having a refractivity lower than that of the silicon substrate 50, such as a silicon dioxide layer, is formed on the silicon substrate 50. Next, as shown in FIG. 6(e), the mask 52 together with the dielectric layer 54 thereabove is removed to obtain column-like silicon resonators 56. Next, as shown in FIG. 6(f), the entire structure is illuminated with a laser to obtain ball-like silicon resonator 56 with smooth surfaces. The ball-like silicon resonator has a Q value (quality factor) much higher than the column-like silicon resonator. Besides, less silicon exists below the ball-like silicon resonators 56, and the equivalent refractivity difference thereof can implement the function of resonators. The silicon resonators 56 mentioned above can continue to be heated to oxidize parts of the silicon thereof. Then, the silicon resonator 56 and the silicon substrate 50 are separated by silicon dioxide. Thus is achieved a better resonant performance. The silicon resonators 56 can even be heated persistently to attain silicon dioxide resonators with smooth surfaces.

Figure 7:
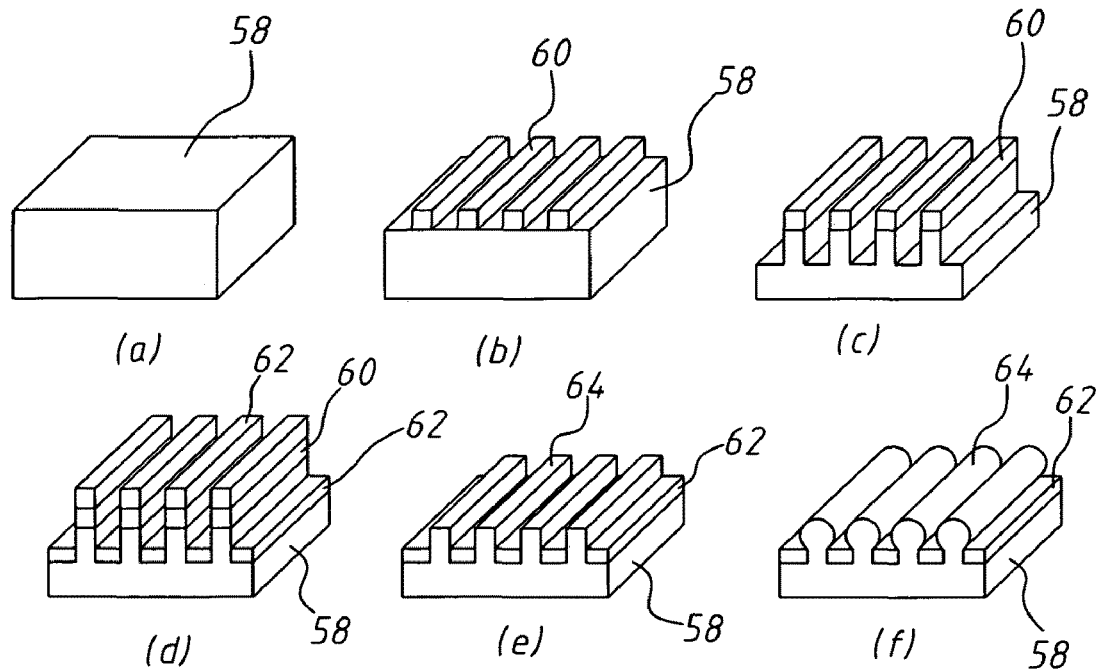
FIGS. 7(a)-7(f) are diagrams schematically showing steps of a method for fabricating a waveguide with a smooth surface according to the present invention.

The present invention also proposes a method for fabricating an optical waveguide with a laser. As shown in FIG. 7(a), a silicon substrate 58 is provided. Next, as shown in FIG. 7(b), at least one patterned mask 60 is formed on the silicon substrate 58 to define the regions where waveguides are to be formed. Next, as shown in FIG. 7(c), the silicon substrate 58 together with the mask 60 is etched with a RIE (Reactive Ion Etching) method or an ICP-RIE (Inductively Coupled Plasma-RIE) method to obtain desired patterns, such as plates. Next, as shown in FIG. 7(d), a dielectric layer 62 having a refractivity lower than that of the silicon substrate 58, such as a silicon dioxide layer, is formed on the silicon substrate 58. Next, as shown in FIG. 7(e), the mask 60 together with the dielectric layer 62 thereabove is removed to obtain plate-like silicon waveguides 64. Next, as shown in FIG. 7(f), the entire structure is illuminated with a laser to obtain plate-like silicon waveguides 64 with smooth surfaces. Less silicon exists below the silicon waveguides 64 with smooth surfaces, and the equivalent refractivity difference thereof can implement the function of waveguides. The silicon waveguides 64 mentioned above can continue to be heated to oxidize parts of the silicon thereof. Also, the substrate itself can be heated to oxidize a portion thereof. Then, the silicon waveguides 64 and the silicon substrate 58 are separated by silicon dioxide. Thus is achieved a better waveguide performance.

The method of the present invention can apply to optical elements made of various materials, such as gallium arsenide, gallium aluminum arsenide, indium phosphide, indium gallium aluminum phosphide, and gallium nitride. The present invention can improve the wavelength selection capability of a resonator and promote the performance of the resonator. For example, when applied to a silicon photonic circuit, the improved resonator can increase light efficiency, decrease critical current, and reduce loss. The method of the present invention can apply to optical elements integrated with IC inside a chip to fabricate high-performance electronic circuits and optical circuits.

In conclusion, the method of the present invention can smooth the surfaces of optical elements and promote the performance of resonators or waveguides. Thus, the present invention is a very useful innovation.

The embodiments described above are only to exemplify the present invention but not to limit the scope of the present invention. Therefore, any equivalent modification or variation according to the shape, structures, characteristics and spirit disclosed in the present invention is to be also included within the scope of the present invention.

What is claimed is:

1. A method for smoothing a surface of an optical element with a laser comprising
   Step (A): providing at least one optical element having a rough surface, said optical element being disposed on a substrate;
   Step (B): illuminating said rough surface of said optical element with a laser to make said optical element absorb laser energy and melt into a liquid, wherein said liquid is stretched and planarized by surface tension of said rough surface and then solidifies into a smooth surface, wherein said optical element is formed into a structure; and
   Step (C): heating said substrate to oxidize a portion of said substrate, thereby separating said optical element from said portion of said substrate.

2. The method for smoothing a surface of an optical element with a laser according to claim 1, wherein said optical element is fabricated with a method comprising Step (A1): providing a substrate, forming at least one patterned mask on said substrate, and etching said substrate together with said at least one patterned mask to obtain desired patterns;
   Step (A2): forming on said substrate a dielectric layer having a refractivity lower than that of said substrate; and
   Step (A3): removing said at least one patterned mask to obtain said optical element on said substrate.

3. The method for smoothing a surface of an optical element with a laser according to claim 1, wherein in said Step (B), said laser is projected onto all of said at least one optical element simultaneously or projected to groups of said at least one optical element one by one in sequence.

4. The method for smoothing a surface of an optical element with a laser according to claim 1, wherein said at least one optical element is a waveguide or a resonator.

5. The method for smoothing a surface of an optical element with a laser according to claim 1, wherein said at least one optical element is made of silicon, silicon dioxide, a semiconductor, an organic compound, a glass, or a dielectric material.

6. The method for smoothing a surface of an optical element with a laser according to claim 1, wherein illuminating said rough surface is undertaken in a vacuum environment or an environment full of a gas.

7. The method for smoothing a surface of an optical element with a laser according to claim 6, wherein said gas is air, hydrogen, nitrogen, or argon.

8. The method for smoothing a surface of an optical element with a laser according to claim 1, wherein illuminating said rough surface is undertaken at a temperature of from 100 to 1000° K.

9. The method for smoothing a surface of an optical element with a laser according to claim 1, wherein said laser is an excimer laser, a solid-state laser, a gas laser, or a semiconductor laser.

10. The method for smoothing a surface of an optical element with a laser according to claim 1, wherein said laser is a CW (Continuous Wave) mode laser or a pulse mode laser.

11. The method for smoothing a surface of an optical element with a laser according to claim 1, wherein before said Step (B), said laser passes through an optical system to homogenize intensities of said laser; then, said Step (B) follows.

12. The method for smoothing a surface of an optical element with a laser according to claim 4, wherein said resonator is a Fabry-Perot resonator or a photonic-crystal resonator.

13. The method for smoothing a surface of an optical element with a laser according to claim 4, wherein said resonator has a shape of a disc, a sphere, an ellipsoid, a parallelepiped, a cuboid, or a triangular prism; said waveguide has a shape of a cylinder.

14. The method for smoothing a surface of an optical element with a laser according to claim 1, wherein when said at least one optical element and a plurality of electronic elements are jointly formed on a substrate, a light-blocking layer is selectively formed on said electronic elements to protect said electronic elements before said Step (B).

15. The method for smoothing a surface of an optical element with a laser according to claim 14, wherein said light-blocking layer is a light-absorbing layer or a light-reflecting layer.

16. The method for smoothing a surface of an optical element with a laser according to claim 14, wherein said light-blocking layer is made of a metallic material, a photoresist material, or a dielectric material.

17. The method for smoothing a surface of an optical element with a laser according to claim 14, wherein said substrate is a transparent substrate, a semiconductor substrate, a metal substrate, or a ceramic substrate.

* * * * *